Figure 1:
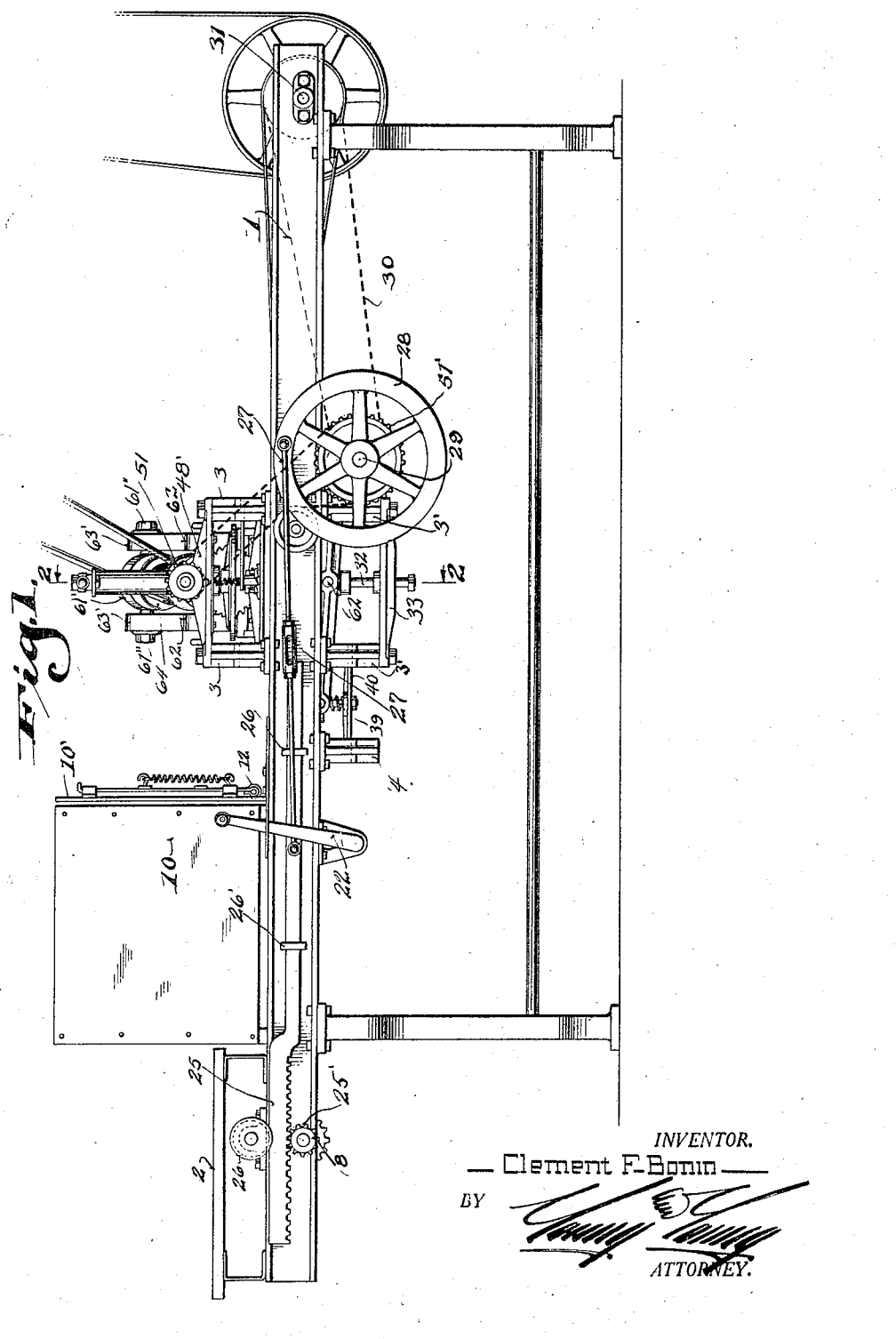

May 8, 1923.

C. F. BONIN 1,454,264

WOODWORKING MACHINE

Filed July 18, 1921

5 Sheets-Sheet 1

INVENTOR.
Clement F. Bonin
BY
ATTORNEY.

May 8, 1923.

C. F. BONIN 1,454,264

WOODWORKING MACHINE

Filed July 18, 1921

5 Sheets-Sheet 3

INVENTOR.
Clement F. Bonin
BY
ATTORNEY.

May 8, 1923.

C. F. BONIN 1,454,264

WOODWORKING MACHINE

Filed July 18, 1921

5 Sheets-Sheet 4

INVENTOR.
Clement F. Bonin
BY
ATTORNEY.

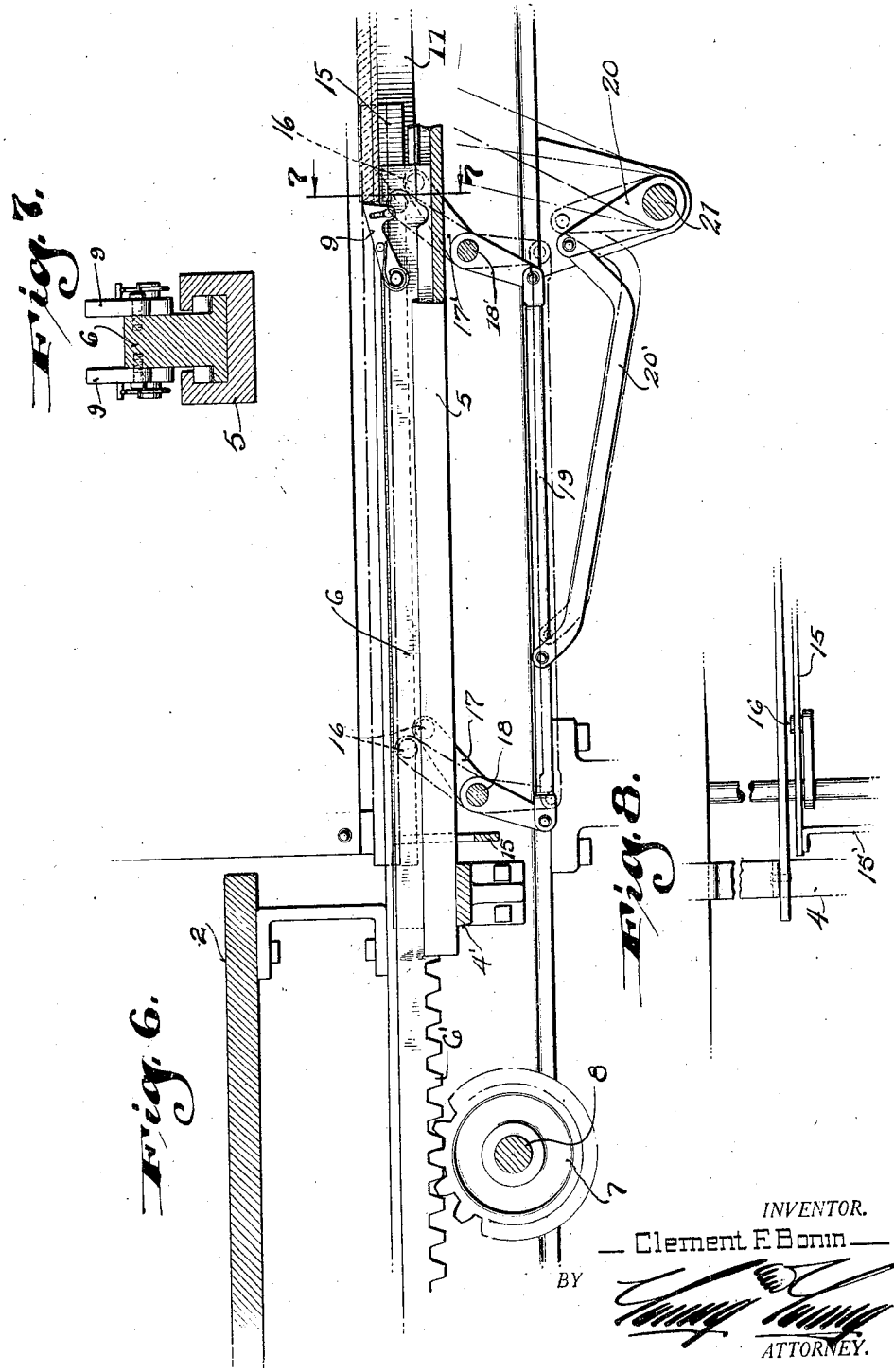

Patented May 8, 1923.

1,454,264

UNITED STATES PATENT OFFICE.

CLEMENT F. BONIN, OF DENMARK, WISCONSIN.

WOODWORKING MACHINE.

Application filed July 18, 1921. Serial No. 485,616.

*To all whom it may concern:*

Be it known that I, CLEMENT F. BONIN, a citizen of the United States, and resident of Denmark, in the county of Brown and State of Wisconsin, have invented certain new and useful Improvements in Woodworking Machines; and I do hereby declare that the following is a full, clear, and exact description thereof.

My invention refers to wood working machines, and it has for its primary object to provide a simple, and economical high speed machine for cutting circular heads from wood blanks automatically fed to a saw, whereby speed of production is increased to a maximum.

Other objects of my invention are:

To provide a chuck comprising normally spaced gripping jaws for the reception of the blank, the same being under cam control whereby they are caused to frictionally grip a blank and lift it to a higher plane, within the path of a circular saw unit, the chuck being thereafter dropped to its normal plane and opening to permit ejection of the finished head through its engagement with an incoming blank.

To provide a blank receiving chuck mechanism associated with a continually rotative clutch element, whereby the chuck containing the blank is revolved when lifted to a plane, for engagement with the clutch unit.

To provide a cam for controlling vertical movement of the chuck mechanism, whereby it will be timed to perform one revolution for cutting the blank and to thereafter drop to its normal position of rest with the gripping members of the chuck element spaced apart, preparatory to receiving and discharging the blank and finished head respectively.

To provide an intermittently driven feed mechanism for delivering the blanks to the chuck, the same being associated with a manually controlled device for stopping the feed in emergency.

To provide a reciprocative feed dog associated with a track for delivering the blanks, with means for lifting said blanks above the line of travel of the feed dog, whereby the feed mechanism is thrown out of operation under certain conditions.

With the above and other minor objects in view, the invention consists in certain pecularities of construction and combination of parts that are hereinafter set forth with reference to the accompanying drawings and subsequently claimed.

In the drawings,

Figure 1 represents a side elevation of a head cutting machine, embodying the features of my invention.

Figure 2:
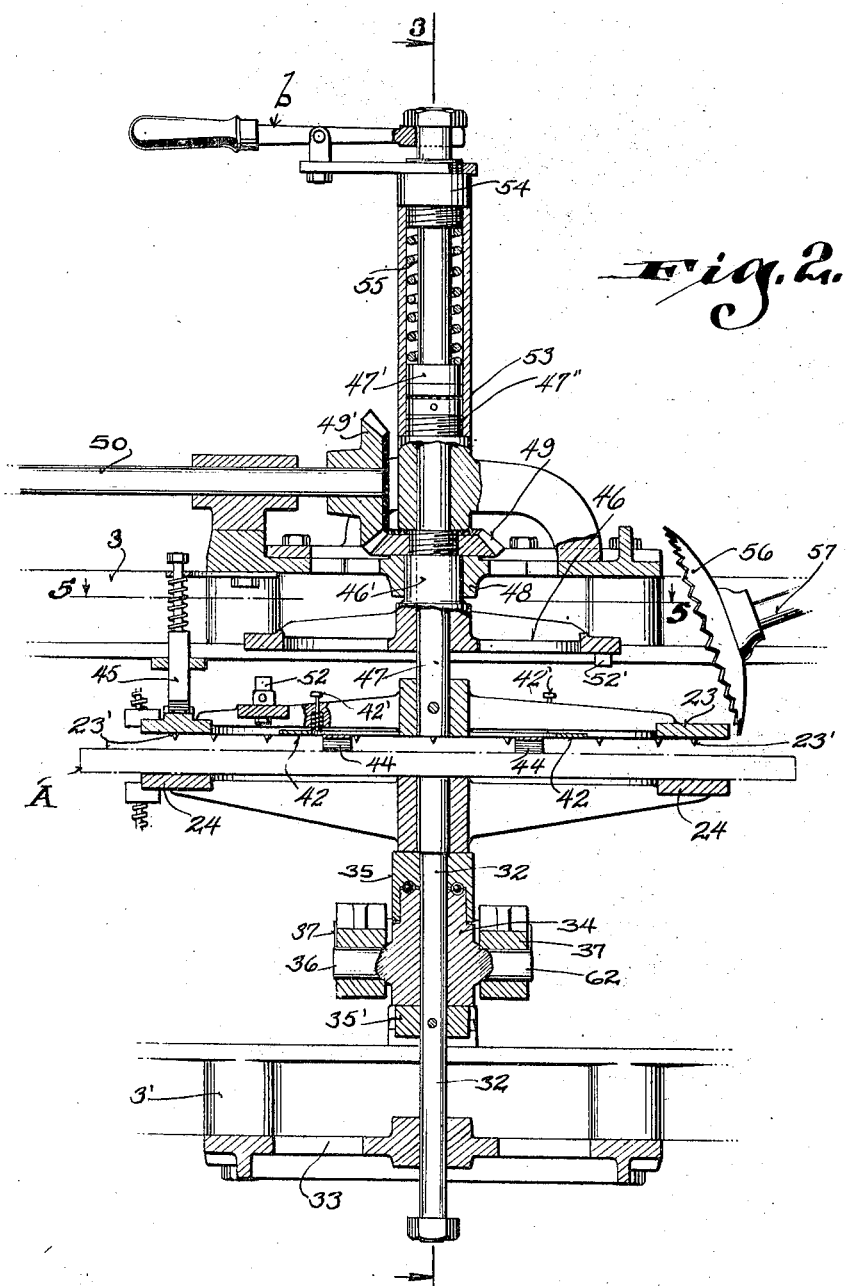

Figure 2, an enlarged fragmentary sectional elevation of the blank chuck mechanism, the section being indicated by line 2—2 of Figure 1.

Figure 3:
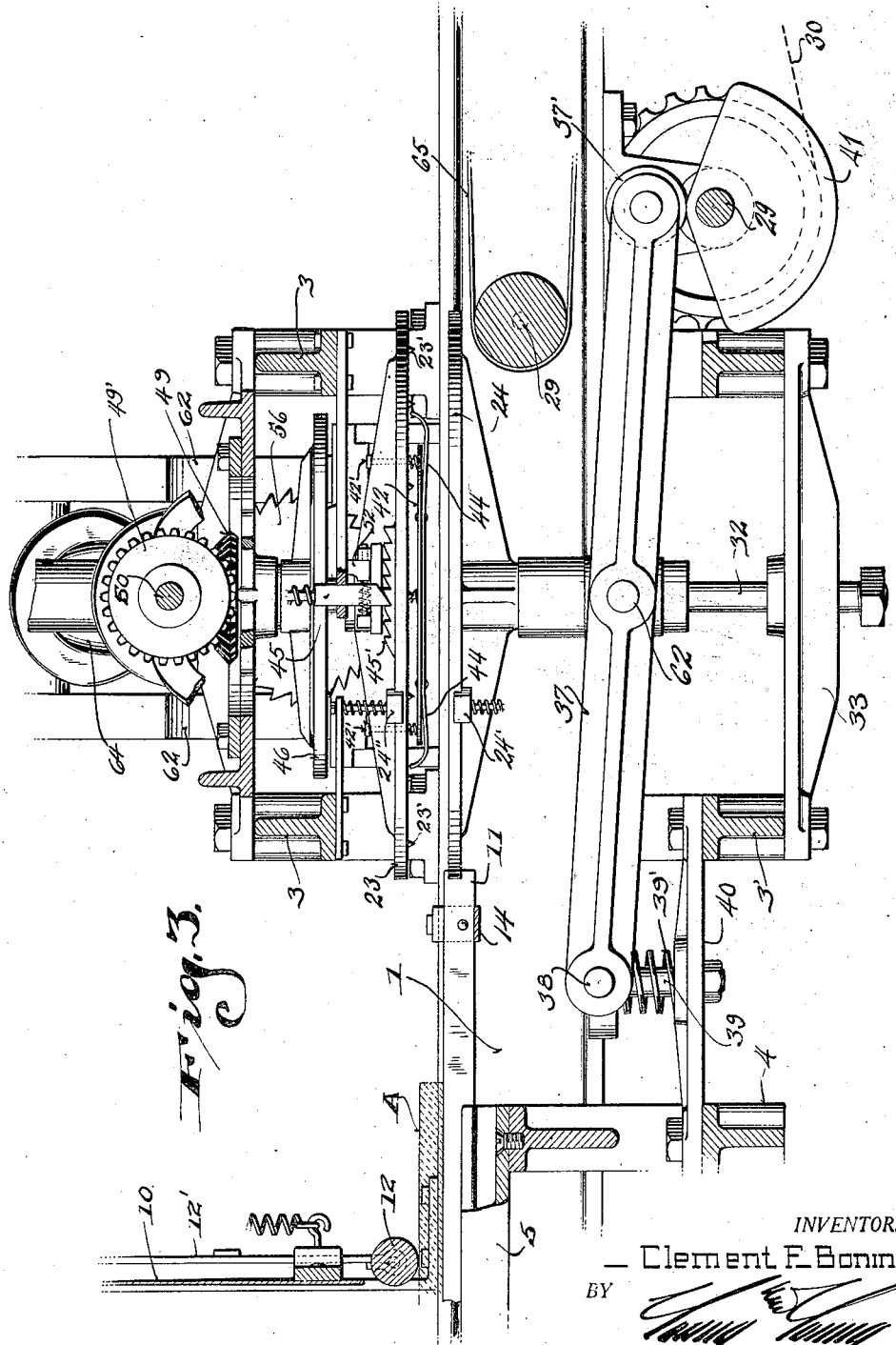

Figure 3, a similar fragmentary sectional elevation of the blank chuck mechanism, the section being taken at a right angle to the plane of section of Figure 2, the said section being indicated by line 3—3 of Figure 2.

Figure 4:
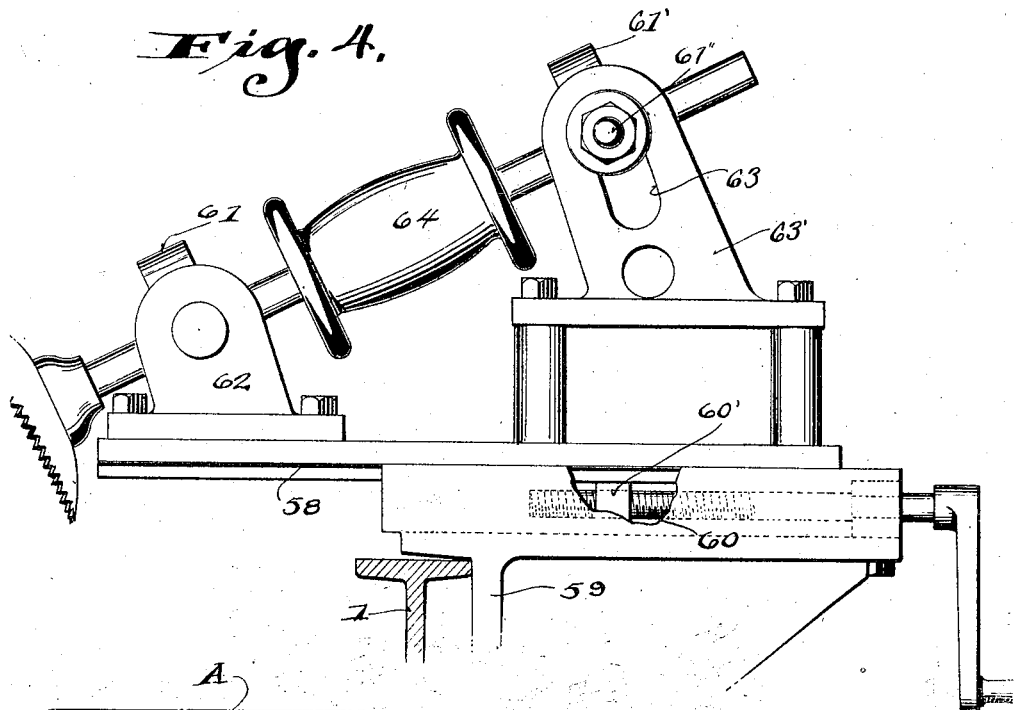

Figure 4, a detailed sectional view through a portion of the machine illustrating the saw, its arbor and associated adjusting mechanism.

Figure 5:
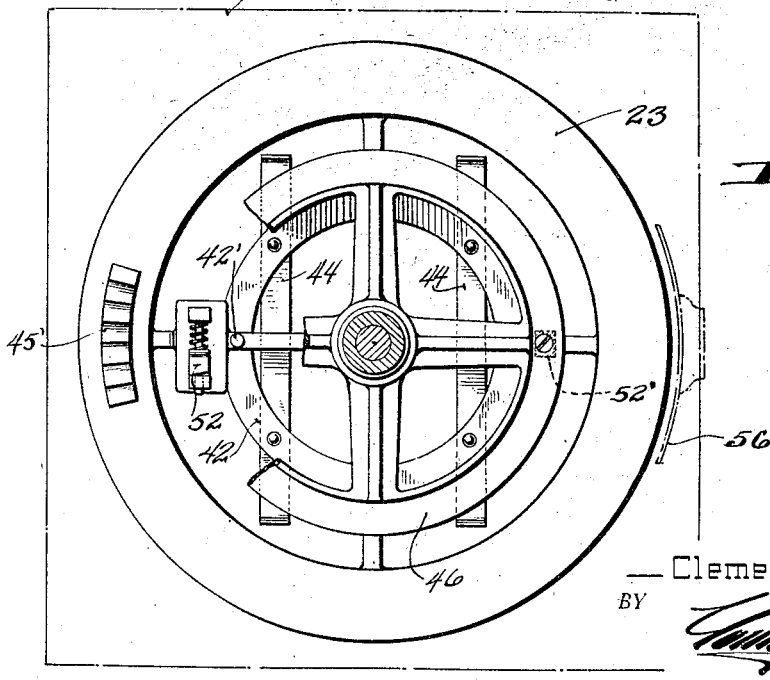

Figure 5, a detailed plan section view of said chuck mechanism, the same being indicated by line 5—5 of Figure 2.

Figure 6, a fragmentary longitudinal sectional view of the blank feed mechanism, the same illustrating particularly the feed dog for the blanks and the track therefor, and manually controlled means for lifting the blank, whereby the said dog is rendered inoperative in emergency.

Figure 7, a detailed cross section illustrating the said dog and associated mechanism, the section being indicated by line 7—7 of Figure 6, and Figure 8, a fragmentary detailed plan view of the track mechanism for supporting the blanks.

Referring by characters to the drawings, 1 represents leg supported longitudinal beams, which beams have secured thereto, companion upper and lower struts 3—3, 3'—3'. The beams are also connected by a pair of struts 4—4', as best indicated in Figures 3 and 6 of the drawings, which struts primarily support a longitudinal disposed channeled guide bar 5, which guide bar serves as a track for reciprocative feed bar 6. The rear portion of this feed bar is formed with a toothed rack 6', which rack engages a correspondingly toothed pinion 7 that is mounted upon a shaft 8, the same being suitably journaled in the frame beams 1. The forward end of the feed bar carries a pair of spring controlled yieldable feed dogs 9, which dogs are adapted to engage the rear edge of the wood blanks A, whereby they are progressively fed towards the chuck mechanism.

In operation a stack of the blanks A are nested within a suitable hopper 10, and the innermost blank is supported by fixed track rails 11, there being a clearance space between the lower edge of the front wall 10' of the hopper, whereby the lowermost blank is ejected therefrom, by the feed dogs. The discharge mouth of the hopper thus formed is controlled by a yieldable roller 12, which roller is mounted, as best shown in Figures 1 and 3 of the drawings, upon a reciprocative frame 12'. The roller and its frame are yieldingly held down so as to form a mouth slightly less in depth than the thickness of the blanks, whereby when a blank is fed forward for operation, the roller 12 will exert a slight pressure on the blank to hold and guide it in its travel.

As shown in Figure 6, an auxiliary table 2 is provided for the support of a stack of the blanks which can be, from time to time, placed by the operator into the hopper 10. The fixed track rails 11 are supported by a transversely disposed strap 14 at their front ends, and at their rear ends by the strut 4'.

As best shown in Figures 6 and 8, the fixed track rails for the blanks are associated with a pair of vertically movable track rails 15. The vertically movable track rails 15 are cross connected by a brace bar 15', and they are supported by trunnions 16, which trunnions extend from front and rear rock arms 17—17' that are mounted on cross-shafts 18—18', the same being mounted in the frame beams 1. The rock arms are connected by a tie rod 19, which tie rod is connected to an arm 20 by a link 20', as shown in Figure 6. The arm 20, in turn, is secured to a rock shaft 21 that is suitably journaled in brackets depending from the frame beams and terminates at its outer end with a manually controlled lever 22, as best shown in Figure 1.

From the foregoing description, it will be obvious that the floating truck rails and the fixed track rails are normally upon a common plane, whereby the lowermost blank A is supported, and in a forward feed movement of the feed bar 6, the feed dogs 9 will engage the outer edge of the lowermost blank and cause the same to be slid forward between spaced upper and lower gripping disks 23, 24 respectively. It is understood that to cause this forward feed movement of the feed bar, the shaft 8 is rotated a predetermined number of revolutions, through a rack and pinion gear connection 25—25', as best shown in Figure 1. The rack 25 is held in engagement with its associated pinion by an idle roller 26, and said rack is also guided in ears 26' that project from the frame beam 1, as indicated in Figure 1 of the drawings.

Reciprocation is imparted to the rack 25 by a pitman rod 27, which rod is in wrist pin connection with a fly-wheel 28 that is mounted upon a shaft 29, the same being suitably journaled in bearing brackets, depending from the frame beams. It will be understood that the blanks are normally rectangular in shape, and these blanks may be of different dimensions. Hence, in order to provide adjustment whereby feed of different-sized blanks may be had, I provide a turn buckle 27', which turn-buckle interrupts the pitman rod, whereby the same can be adjusted as to length in order to time the feed mechanism for the blanks. This adjustment will thus set the feed dogs back or forth a predetermined distance from the edge of the blank to be fed, whereby the lost motion will compensate for blanks of different lengths or sizes. Motion is imparted to the counter-shaft 29 by a suitable chain belt connection 30 from a power-shaft 31 to the counter-shaft 29. The power-shaft receives its motion from a belt and pulley connection to a source of power, it being understood that the drive pulley may be provided with a suitable clutch, whereby the power is thrown on and off. This mechanism forms no part of my invention and is, therefore, not illustrated.

As best shown in Figures 2 and 3 of the drawings, the lower gripping disk 24 of the chucking mechanism is mounted upon a dead spindle 32, which spindle is reciprocatively journaled in a bracket 33 that is secured to the lower struts 3'. A hub 34 is loosely mounted upon the spindle, between upper and lower collars 35—35' respectively, the said hub being formed with offset trunnions 36 for engagement with spanner arms of a cam controlled lever 37. The lever 37 is fulcrumed to a head 38, which head is formed with a depending stud 39 that extends through a bracket 40, the same being fixed to one of the cross struts 3' and the cross struts 4 of the frame.

Surrounding the stud 39 of the head is a coil spring 39', the same being compressed between the head and the face of the bracket 40, whereby the fulcrum of the cam lever 37 is capable of yield under certain conditions, particularly where the chucking mechanism may become choked or blocked in its upward movement, which movement will be hereinafter described.

The free end of the cam lever 37 carries an antifriction roller 37', which roller engages a face cam 41 that is secured to the counter-shaft 29. When the cam 41 is in position, as indicated in Figure 3 of the drawings, the lever 37 and connections to the gripping disk 24 will, by gravity or spring pressure, cause the disk to assume its idle position slightly below the plane of travel of the blanks A, and in said position, the gripping disk will rest upon a yielding brake block 24', whereby the disk is frictionally held against idle rotation. Both of the gripping disks are of the spider type, and the upper gripping disk 23 is provided with a series of minute spurs 23' upon its lower face, which spurs are adapted to enter the surface of the blank and thus positively lock the same in position preparatory to rotation of said blank.

In order to prevent overthrow of the blank, when it is fed between the gripping disks and also to insure stripping of the finished disk from its engagement with the same, I provide a yielding stripper ring 42, which ring has extended therefrom, anchor pins 42' that are reciprocatively mounted in suitable apertures formed in the spider arms of the upper disks 23. The ring 42 is normally forced away from the under face of the gripping disk 23 by coil springs 43 which are interposed between the ring and said face about the anchor pins 42' as best shown in Figures 2, 3 and 5.

The stripper ring 42 has also secured thereto, a pair of yielding blank guide runners 44, the ends of which are bowed upwardly, and when the chuck mechanism is in its normal position of rest, these runners assume parallel relations to the line of travel of the blank A, whereby said blank will be forced thereunder and slowly retarded in its final travel. It will be noted that, as shown in Figure 3, when the associated cam controlled gripping disks are in position to receive a blank, the upper disks 23, in each rotation, will come to a stop, whereby the runners are parallel to the line of travel of the feed blanks, and in this position, the upper gripping disk is not only frictionally held by a yielding brake block 24'', but it is also held by a spring controlled one-way dog 45, which dog engages one of a series of ratchet teeth 45' that projects from the upper face of the disk, whereby said disk is locked against inadvertent back lash and also against forward movement through inertia imparted to the disk prior to completion of its cycle.

It will be seen that both the brake 24'—24'' are suitably anchored to the struts, as is also the spring controlled dog 45, whereby these parts remain fixed in their relative position to operate upon the disks.

It will be further noted that when the cam 41 causes the lower gripping jaw to lift, whereby the blank A is firmly secured between the opposite faces of the companion disks, the upper disk is capable of a slight lift under spring pressure (to be hereinafter described), and when said lifting takes place, the brake block 24'', as well as the spring dog 45 will lift also, due to their yielding connection.

In order to impart positive drive to the companion gripping disks, whereby the blank is revolved in one turn, I provide a continuously driven clutch member 46, the hub 46' of which is loosely mounted upon a dead spindle 47, which spindle is aligned with the spindle 32, and has secured thereto, the upper gripping disk 23. The hub of the clutch member 46 is shouldered and journaled in a cross bracket 48, that is suitably secured to the upper struts 3. The upper end of the hub 46 projects above the cross bracket and has secured thereto, a bevel gear wheel 49, which bevel gear wheel meshes with a corresponding bevel gear wheel 49', that is secured to a cross shaft 50.

The cross shaft 50 is mounted in suitable channels one of which projects from the cross bracket 48, the other being formed in a corresponding cross bracket 48', as best shown in Figure 1 of the drawings. The outer end of the cross-shaft 50 carries a sprocket wheel 51, which is in belt drive connection to a larger sprocket wheel 51' that is secured to the counter-shaft 29. Hence it will be seen that power is applied to the clutch member 46, which member is continuously rotated and when the gripping disk 23 is lifted under cam control to a sawing position, a spring controlled lug 52, which is carried by said disk, will come into the line of travel of a fixed lug 52', whereby said fixed lug will engage the yieldable lug and will absorb the shock of said engagement it being understood that these connected parts will thereafter be rotated as one during a complete revolution of the blank.

The upper end of the spindle 47, which carries the disk 23, is journaled in a tubular housing 53, which housing is connected by arms to the cross bracket 48. The upper end of said housing is provided with a threaded cap 54 between which cap and the opposite face of a collar 47', there is interposed a spring 55, it being understood that the collar 47' is fixed to the spindle 47, whereby said spindle is normally forced downward by the spring pressure, limit of the movement being had through engagement of the collar with an anti-friction ball bearing 47'' that constitutes a part of the tubular housing.

As best indicated in Figures 2 and 4 of the drawings, the cutting mechanism comprises a circular saw 56, which saw is dished upon a radius described from the axis of the chuck mechanism, the radius corresponding to the approximate diameter of the head to be cut from the blank. The saw is secured to an arbor 57, which is disposed at an angle with relation to the blank, whereby the lower series of saw teeth are positioned at approximate right angles to the face of the blank being cut. Obviously the cutting series of teeth are positioned slightly above the upper surface of the blank, and when the cutting takes place, the chucked blank is lifted but not rotated initially. Hence the teeth of the saw will cut an initial slot in the blank as said blank moves up to its normal high position, at which time the clutch 46 will engage the associated gripping disk and start upon the cycle of rotation, whereby the finished head is cut from the blank.

It is desired, in some instances, to cut blanks of different diameters, hence the bed 58 which carries the saw arbor is slidably mounted in a knee 59 that is suitably secured to one of the frame beams. The knee carries a threaded spindle 60, which spindle is in threaded engagement with an ear 60′ that depends from the bottom of the bed 58. By this arrangement, the saw arbor can be moved back and forth with relation to the axis of rotation of the chuck mechanism. The inner end of the saw arbor is journaled in a block 61, which block is trunnioned in ears 62 that project from the bed 58. The rear end of the arbor is journaled in a similar block 61′ and the trunnions 61″ of this rear block are extended through slots 63 that are formed in ears 63′, projecting from the bed 58. By this trunnion and slot connection, the rear end of the arbor can be rocked about the trunnion of the front block 61, whereby the angle of the saw is varied slightly.

It is understood that the saw arbor carries a suitable pulley 64 for high speed belt drive, from a suitable source of power.

From the foregoing description, it will be seen that a blank is fed between the disk members with each forward feed movement of the feed bar 6 under normal working conditions, and this forward movement is followed by a vertical movement of the chuck mechanism, whereby the blank is brought into the field of the saw and is rotated to cut a circular head. Co-incident to completion of the cutting, the chuck mechanism drops to its normal position whereby the upper and lower gripping disks are separated, and as this movement takes place, the stripping ring associated with the upper gripping disk will eject the finished head from its biting engagement with the upper disk, whereby said finished head will drop upon the face of the lower disk and be ejected therefrom, through engagement of the blank which is being fed by the said gripping disk. The waste material and the completed circular head will then drop upon an endless conveyor belt 65, which belt is mounted upon suitable rollers carried respectively by the frame members and power shaft 31. The waste and finished material is, thereby, delivered to any suitable receptacle or mechanism where they may be separated.

Hence it will be seen that the machine is practically continuous in its operation and automatic, it only being necessary to employ one unskilled feeder for maintaining a constant supply of the blanks within the hopper 10.

The upper spindle is provided with an actuating lever $b$, for the purpose of manually lifting the gripping disk 23 in opposition to its spring control, whereby the disks may be separated by hand under certain conditions.

While I have shown and described one method of carrying out my invention in all of its specific details, it is understood that I may vary the details of construction in many ways known to the skilled mechanic and within the scope of the claim, as it may be hereafter interpreted by those skilled in mechanical construction.

I claim:

A circular head cutting machine, comprising a pair of aligned normally spaced gripping discs, adapted to receive a blank, cam controlled means for imparting axial movement to the discs after a blank has been inserted therebetween, positively driven clutch mechanism for engagement with the associated discs, whereby they are rotated after they have been moving axially in a blank gripping operation, a circular dished saw associated with the discs, having its cutting edge above the normal plane of a blank carried by said discs, an annulus carried by the upper of said discs, a pair of yielding guide runners each attached intermediate its end to said annulus, each of said runners being elongated and curved upwardly at its ends to permit the blanks to slide into place.

In testimony that I claim the foregoing I have hereunto set my hand at Denmark, in the county of Brown and State of Wisconsin.

CLEMENT F. BONIN.